July 30, 1946.  R. S. JESIONOWSKI  2,405,039
DIE UNIT FOR EXTRUDING SHAPES OF ORGANIC PLASTIC MATERIALS
Filed Feb. 26, 1944
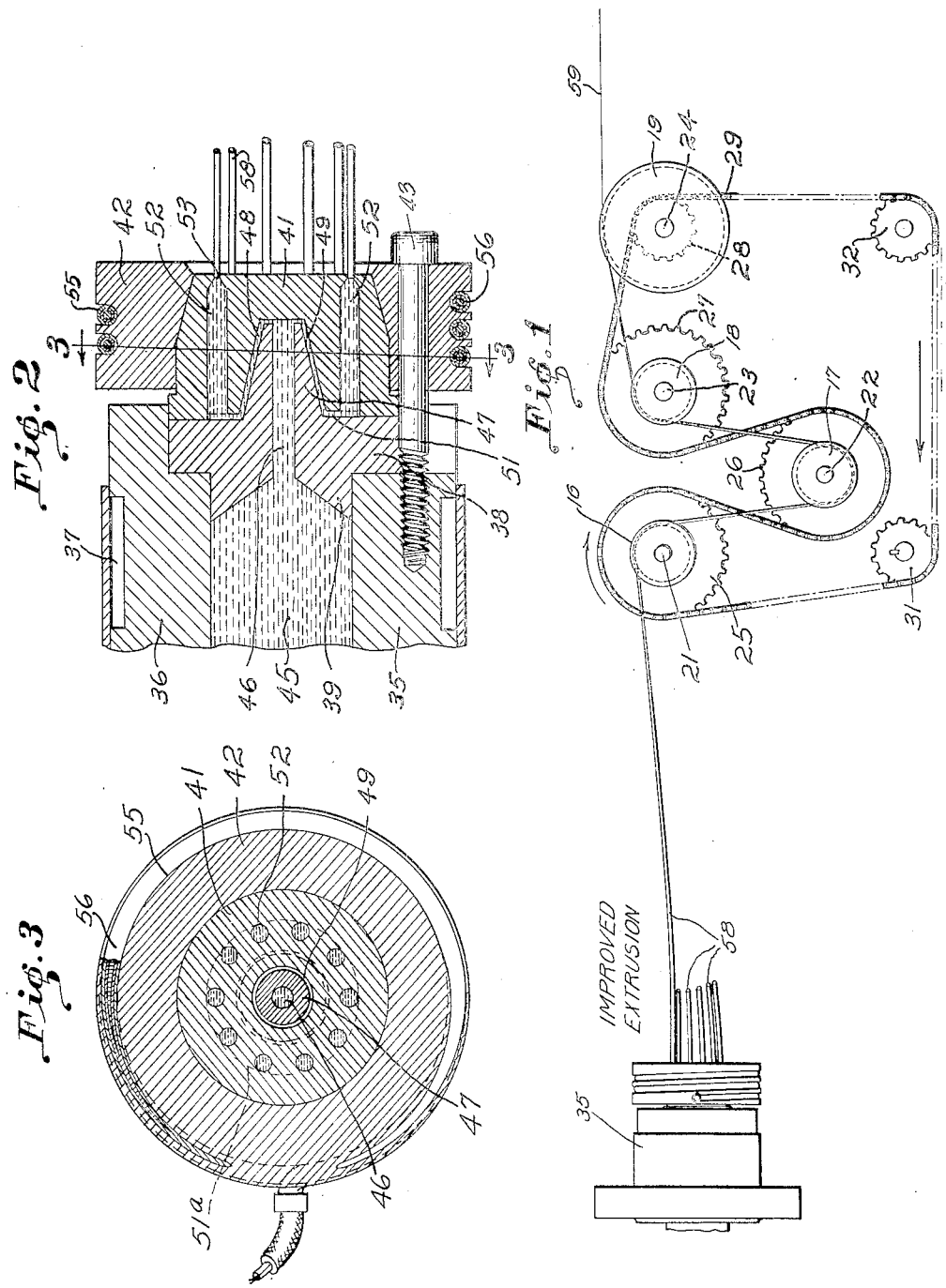
Inventor
Raymond S. Jesionowski Patented July 30, 1946

2,405,039

UNITED STATES PATENT OFFICE 2,405,039

DIE UNIT FOR EXTRUDING SHAPES OF ORGANIC PLASTIC MATERIALS

Raymond S. Jesionowski, Hartford, Conn., assignor to Plax Corporation, Hartford, Conn., a corporation of Delaware Application February 26, 1944, Serial No. 524,116

3 Claims. (Cl. 18—12)

This invention relates to the forming of shapes by extrusion of organic plastic materials through a die and has particular relation to the extrusion of shapes to be drawn into fiber.

Fiber of organic plastic material has many uses which usually require that the fiber is smooth and of uniform gauge. For example, fiber of polystyrene is useful as electrical insulation.

But unexpected difficulty has been experienced in attempting to extrude certain plastic materials which may be drawn into fiber such as polystyrene. This difficulty arises when such materials are heated and extruded through a die in the customary way to form small shapes such as rods which may be drawn into fiber. The difficulty is that the material wiggles violently as it issues from the die and assumes a crinkled or approximately spiral shape instead of forming a smooth straight shape of uniform thickness. When the crinkled shape is drawn, a fiber of very uneven thickness or gauge is formed, the variations in thickness being very pronounced. Such fiber is defective for most purposes.

The object of the present invention is to provide a novel die unit for extruding small shapes of organic plastic materials by the use of which wiggling of extruding shapes is prevented and a smooth shape of uniform thickness may be formed.

Other objects and advantages of the invention will be pointed out in or will be apparent from the following specification and the accompanying drawing in which:

Fig. 1 is a partial view in side elevation of an extrusion die unit embodying the present invention and of drawing apparatus for the production of fibre;

Fig. 2 is an enlarged view in vertical longitudinal section of the extrusion die unit of Fig. 1; and Fig. 3 is a view in transverse section taken on the line 3—3 of Fig. 2 looking in the direction of the arrows.

In the apparatus illustrated in the drawing there is shown at 35 an extrusion die unit embodying the invention and which forms a part of the extrusion apparatus. The rest of such apparatus (which is not shown) comprises a screw driven by suitable means, and operating in a heated cylinder into which organic plastic material is fed so that it can be heated, compressed and worked into a substantially uniform mass of the desired working viscosity. The die unit 35 is suitably connected to the screw stuffer and receives hot plastic material therefrom, as explained hereinafter.

The drawing rolls 16, 17, 18 and 19 may respectively be mounted on shafts 21, 22, 23 and 24, driven by sprockets 25, 26, 27 and 28 by means of a chain 29 which, in turn, is driven by one of the two sprockets 31 and 32. The chain 29 is driven at such speed and the sizes of the respective sockets are so proportioned as to cause the pulling rolls to rotate at the desired speeds to draw the plastic material and reduce its size to the size desired. It will be understood that any suitable means may be employed for drawing the fiber.

The die unit 35 comprises a barrel 36, heat jacketed at 37. The barrel 36 is provided with a bushing 38 the inner end 39 of which fits into the barrel. Associated with the bushing is a die plate 41 which is surrounded by a retainer ring 42 through which pass bolts one of which is indicated at 43, screwed into the outer end of the barrel 36 and serving to hold the bushing, die plate and retainer ring in assembled relation, as shown.

The inner end 39 of the bushing 38 is inwardly turned to conical shape, as indicated at 44, so as to direct the plastic material 45 from the screw stuffer (not shown) into the central passage 46 which runs through the bushing. This passage 46 preferably is of substantial diameter approximately as shown.

On its outer face, the bushing 38 carries a conically shaped projection 47 which is received by, but slightly spaced from a conically shaped hole 48 formed on the inner side of the die plate 41, thus providing a restricted, unobstructed passage 49 of conical shape and annular cross section between the bushing 38 and the die plate 41. This passage 49 is extended at its base through a transverse annular passage 51 into a number of longitudinal passages 52 drilled from the inner side of the die plate 41 through the passage 51 tangent to the outer edge 51a of said passage, as shown in Fig. 3. Any desired number of passages 52 may be provided, ten of such passages being shown equally spaced in a circle concentric to the axis of the die plate 41. The outer ends of the passages 52 may converge to form smaller orifices at 53, which orifices preferably have relatively thin lips as shown.

The outer edge of the ring 42 may be spirally grooved as shown at 55 to receive an electrical resistance 56, which may be wound in the grooves for the purpose of heating the ring 42, plate 41, and bushing 38, which also will be heated by the barrel 36 from jacket 37.

The plastic material is so acted upon in the die unit 35 that wiggling of the extruding material is eliminated and smooth shapes or rods are extruded, such as shown at 58. When such extruded shapes are drawn as by means of the drawing rolls 16, 17, 18 and 19, Fig. 1, a smooth fiber 59 of uniform thickness and free of bumps or unevenness is obtained.

The passage 49 preferably is very narrow or restricted, its thickness preferably being of the order of 1/32 of an inch. Also it is preferred to make the passage 52 of substantially greater diameter than the width of passage 49. For best results passage 52 should be greater than 1/8 inch and preferably about 1/4 inch in diameter.

In the use of the novel die unit 35, the plastic material, after being heated and worked in the screw stuffer (not shown) is further heated in the die unit as it passes into it, as it flows through the passage 46 (which effects a substantial reduction in the thickness of the plastic material), as it flows in very thin section through the narrow passages 49 and 51, and as it flows through the substantially larger passages 52 and through the orifices 53.

Such heating, which may be very intense and effective, in conjunction with the diameters or thicknesses of the several passages or their relative proportions, particularly in conjunction with the relative narrowness of passages 49 and 51, through which the plastic passes in thin cross section, insures that the plastic material can be very uniformly heated to a condition of low viscosity by the time it reaches orifices 53. This may serve to permit relaxation of orientation or "elastic memory" particularly of materials which are "rubbery" when heated to extrusion temperatures.

The narrowness of the passages 49 and 51 also provides a substantial drop in pressure between the passages 46 and the passages 52, so that the pressure in passage 52 is relatively low. This relatively low pressure condition in passage 52 may provide the opportunity for relaxation of orientation in the plastic material passing through the passages 52 under the effect of the heat transmitted to the material therein through the ring 42 and the walls of said passages. This pressure drop may also tend to prevent spurting or turbulent flow as the material issues from orifices 53.

The relatively large diameter of the passages 52 may result in a slower rate of flow of the plastic material through said passages than would occur with passages of substantially smaller diameter, for example 1/8 of an inch or less, this affording sufficient time for heating and relaxation of orientation or "elastic memory." The relatively large size of passages 52 may also tend to prevent spurting or turbulent flow through orifice 53.

The conically shaped passage 49 and the annular passage 51 are unobstructed and permit even flow and distribution of the plastic material to the passages 52, thus insuring that the plastic material will extrude at a uniform rate from all of the orifices 53.

It will be understood that the orifices 53 may be of any size desired, that is, may be larger or smaller than shown in Fig. 2. In the production of fiber it is preferred to use a relatively small orifice 53 in order to reduce the amount of drawing necessary to form fiber of small diameter.

Various changes may be made in the details of construction and mode of operation of the illustrated embodiment without departing from the scope of the appended claims.

Having thus described my invention what I desire to claim and secure by Letters Patent is:

1. A die unit for the extrusion of small shapes of organic plastic material without crinkling or spiraling comprising a barrel, a bushing associated with the discharge end of said barrel, a die plate associated with said bushing and having formed therein a plurality of longitudinal passages terminating in extrusion orifices, means for holding said barrel, bushing and die plate in assembled relation, said bushing having a central passage therethrough, spaced complementary surfaces on said bushing and in said die plate respectively which surfaces are constructed and arranged to form an internal, elongated and restricted passage of annular cross section for conducting said plastic material from said central passage to the longitudinal passages in said die plate, and means for heating said die plate.

2. A die unit for the extrusion of small shapes of organic plastic material without crinkling or spiraling comprising a barrel, a bushing associated with the discharge end of said barrel, a die plate associated with said bushing and having formed therein a plurality of longitudinal passages terminating in extrusion orifices, means for holding said barrel, bushing and die plate in assembled relation, said bushing having a central passage therethrough, spaced complementary surfaces, comprising conical surfaces, on said bushing and in said die plate so constructed and arranged as to form an internal, elongated and restricted passage of annular cross-section for conducting said plastic material from said central passage to said longitudinal passages, and means for heating said die plate.

3. A die unit for the extrusion of small shapes of organic plastic material without crinkling or spiraling comprising a barrel, a bushing associated with the discharge end of said barrel, a die plate associated with said bushing and having formed therein a plurality of longitudinal passages of substantial length terminating in extrusion orifices, means for holding said barrel, bushing and die plate in assembled relation, said bushing having a central passage therethrough, spaced complementary surfaces constructed and arranged to form an elongated restricted passage of annular cross section for conducting said plastic material from said central passage to said longitudinal passages, said restricted passage having a width substantially less than that of said longitudinal passages, the width of said restricted passage being of the order of approximately one thirty-second of an inch and the width of said longitudinal passages being of the order of approximately one-quarter of an inch, and means for heating said die plate to heat the plastic material in said destricted passage and in said longitudinal passages.

RAYMOND S. JESIONOWSKI.